United States Patent
Shire

(10) Patent No.: US 12,137,338 B2
(45) Date of Patent: Nov. 5, 2024

(54) METHOD TO ANONYMIZE THE SOURCE OF DIGITAL TRANSMISSIONS

(71) Applicant: Volvo Truck Corporation, Gothenburg (SE)

(72) Inventor: Joshua Shire, Gothenburg (SE)

(73) Assignee: Volvo Truck Corporation, Gothenburg (SE)

(*) Notice: Subject to any disclaimer, the term of this patent is extended or adjusted under 35 U.S.C. 154(b) by 65 days.

(21) Appl. No.: 17/580,142

(22) Filed: Jan. 20, 2022

(65) Prior Publication Data

US 2022/0256336 A1 Aug. 11, 2022

(30) Foreign Application Priority Data

Feb. 5, 2021 (EP) .................................... 21155580

(51) Int. Cl.
*H04L 29/06* (2006.01)
*H04W 12/037* (2021.01)
*H04W 12/106* (2021.01)

(52) U.S. Cl.
CPC ....... *H04W 12/037* (2021.01); *H04W 12/106* (2021.01)

(58) Field of Classification Search
CPC .......................... H04W 12/037; H04W 12/106
USPC ........................................................ 713/161
See application file for complete search history.

(56) References Cited

U.S. PATENT DOCUMENTS

| | | | |
|---|---|---|---|
| 8,656,166 B2* | 2/2014 | Jacobs | G06Q 20/3829 713/168 |
| 9,043,602 B1 | 5/2015 | Krieger et al. | |
| 2003/0112179 A1* | 6/2003 | Gronemeyer | G01S 19/235 342/357.69 |
| 2003/0163737 A1* | 8/2003 | Roskind | H04L 9/3236 726/6 |

(Continued)

FOREIGN PATENT DOCUMENTS

| | | |
|---|---|---|
| CN | 102933980 A | 2/2013 |
| CN | 104247369 A | 12/2014 |

(Continued)

OTHER PUBLICATIONS

Ali, "An overview of End-to-End Verifiable Voting Systems", 2016, Real-World Electronic Voting, pp. 1-40 (Year: 2016).*

(Continued)

*Primary Examiner* — Taghi T Arani
*Assistant Examiner* — Gregory A Lane
(74) *Attorney, Agent, or Firm* — Withrow & Terranova, PLLC

(57) ABSTRACT

A method for private wireless communication from a broadcaster to an observer, including determining a maximum time error between broadcaster and observer and defining a time unit T exceeding the maximum time error, and sharing a secret s with the broadcaster and the observer. At the broadcaster, the method includes transmitting a message containing a security code c, and at the observer, receiving the message and assessing its genuineness by comparing the security code c with a value $h(s, t_{120})$ of a predefined function h for a combination of the secret s and a current epoch $t_{120}$, wherein the current epoch is an integer multiple of the time unit T.

10 Claims, 3 Drawing Sheets

(56) References Cited

U.S. PATENT DOCUMENTS

| | | | |
|---|---|---|---|
| 2007/0086456 A1* | 4/2007 | Kim | H04L 69/32 370/389 |
| 2010/0250607 A1* | 9/2010 | Noh | G06Q 10/00 707/783 |
| 2014/0133656 A1 | 5/2014 | Wurster et al. | |
| 2015/0358322 A1 | 12/2015 | Krieger et al. | |
| 2015/0381451 A1* | 12/2015 | Kolotov | H04J 3/14 709/224 |
| 2018/0278623 A1 | 9/2018 | Koskimies et al. | |
| 2019/0188183 A1* | 6/2019 | Satyanarayanan | G06F 16/1824 |
| 2020/0112427 A1* | 4/2020 | Nakamura | H04L 9/3239 |
| 2021/0075620 A1* | 3/2021 | Driscoll | H04L 63/1466 |
| 2021/0218656 A1* | 7/2021 | Meier | H04J 3/0667 |
| 2022/0256336 A1* | 8/2022 | Shire | H04W 12/02 |

FOREIGN PATENT DOCUMENTS

| | | | |
|---|---|---|---|
| EP | 3320711 A1 | 5/2018 | |
| WO | 2017003337 A1 | 1/2017 | |
| WO | 2017007719 A1 | 1/2017 | |
| WO | 2017055676 A1 | 4/2017 | |

OTHER PUBLICATIONS

Extended European Search Report for European Patent Application No. 21155580.0, mailed Jul. 9, 2021, 10 pages.
Examination Report for European Patent Application No. 21155580.0, mailed Nov. 14, 2023, 4 pages.
First Office Action for Chinese Patent Application No. 202210092203.2, mailed Aug. 21, 2024, 20 pages.

* cited by examiner

METHOD TO ANONYMIZE THE SOURCE OF DIGITAL TRANSMISSIONS

RELATED APPLICATIONS

The present application claims priority to European Patent Application No. 21155580.0, filed on Feb. 5, 2021, and entitled "METHOD TO ANONYMIZE A SOURCE OF DIGITAL TRANSMISSIONS," which is incorporated herein by reference in its entirety.

TECHNICAL FIELD

The present disclosure relates to the field of private wireless communication. In particular, it proposes a method to anonymize a source of digital transmissions.

BACKGROUND

In situations where there are multiple logical beacons whose transmissions are received by an observer device, the observer must have a method to determine which beacon is transmitting the data it would like to receive. This method may rely on a logical identifier. The identifier may appear random to unwanted observers but could in fact be derived from a mathematical (cryptographic) operation involving a value that had been previously agreed to by both receiver and transmitter. One example is the Bluetooth Private Resolvable Address which depends upon the Identity Resolving Key.

Existing solutions require the observer to perform cryptographic operations (e.g., encryption or hashing) on each received packet to determine whether it is from a desired transmitter. It is only after the packet has been received and processed that the observer will know if the data is applicable to it (and safe to use). A problem still in need of a satisfactory solution is how to present an apparently random identifier to unwanted observers that is still predictable by the intended observer prior to processing, so that the intended observer can discard unwanted packets without having to perform cryptographic operations on all received packets.

US2018278623 discloses a method for message verification wherein a hash for a message is formed based on a truncated timestamp, the payload of the message and a secret value. The receiving entity derives the hash value used for the received message based on its own current time. The method allows for a threshold value of time to elapse between the hashing the message by the broadcaster and the receipt of the message by the receiver. In formulas, the broadcaster transmits $$\{LSB_T, h(s, [MSB_T, LSB_T])\}$$

where $MSB_T$ are most significant bits and $LSB_T$ are least significant bits of a clock at the broadcaster side, h is a predefined hash function, and s is secret value shared with the receiver. The receiver compares the hash value with $$h(s, [MSB_R, LSB_T])$$

where $MSB_R$ are most significant bits of a clock time at the receiver side. The split into MSB and LSB shall be such that $MSB_R = MSB_T$ despite an expected amount of clock drift.

SUMMARY

One objective of the present disclosure is to improve existing anonymization/obscuration approaches of the type where each packet—as proof of its genuineness—includes a security code different from that of the previous packet. A particular objective is to make available a method for private wireless communication which, at least in some regards, is safer than currently available solutions and/or is easier to implement and operate. It is a further objective to propose a wireless transmitter and a wireless receiver adapted to participate in such a method.

These and other objectives are achieved by the invention according to the independent claims. The dependent claims relate to advantageous embodiments.

In a first aspect of the present invention, there is provided a method for private wireless communication from a broadcaster to an observer. The method includes the following steps: a maximum time error between broadcaster and observer is determined and a time unit T exceeding said maximum time error is defined; a secret s is shared with the broadcaster and the observer; the broadcaster transmits a message containing a security code c; and the observer receives the message and assesses its genuineness by comparing the security code c with a value $h(s, t_{120})$ of a predefined function h for a combination of the secret s and a current epoch $t_{120}$, wherein the current epoch is an integer multiple of the time unit T.

Here, the current epoch $t_{120}$ acts as a salt (or cryptographic salt). It is important to note that the maximum time error relates not necessarily to the individual broadcaster and individual receiver which perform the later steps of the method. Rather, the maximum time error preferably is determined from the point of view of a generic broadcaster-receiver pair, for which comparable performance and characteristics are valid as for the broadcaster and receiver that perform the later steps of the method.

The method of the first aspect is superior to the arrangement in US2018278623 in that the hash is independent of the LSB of clock time, whereby the LSB need not be transmitted along with the hash value. The method therefore represents a simplification compared to US2018278623 and still achieves a comparable degree of integrity. In fact, the method of the first aspect is arguably safer than US2018278623 since no part of the clock time has to be transmitted over the air.

In a second aspect of the invention, there is provided a method implemented in a broadcaster. The method includes: obtaining an indication of a time unit T, which has been defined with a view to exceed a determined maximum time error between broadcaster and observer; obtaining a secret s which has been shared with an observer; computing a security code $c = h(s, t_{110})$ by evaluating a predefined function h for a combination of the secret s and a current epoch $t_{110}$, wherein the current epoch is an integer multiple of the time unit T; and transmitting (316) a message containing the security code.

In a third aspect of the invention, there is provided a method implemented in an observer. The method includes: obtaining an indication of a time unit T, which has been defined with a view to exceed a determined a maximum time error between broadcaster and observer; obtaining a secret s which has been shared with a broadcaster; receiving a message containing a security code c; and assessing the message's genuineness by comparing the security code c with a value $h(s, t_{120})$ of a predefined function h for a combination of the secret s and a current epoch $t_{120}$, wherein the current epoch is an integer multiple of the time unit T.

In a fourth aspect of the invention, there is provided a computer program containing instructions for causing a computer—or the broadcaster or observer in particular—to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

In fifth and sixth aspects of the invention, there are provided a wireless transmit unit and a wireless receive unit configured to act as broadcaster and observer, respectively, in the sense of the above methods.

The further aspects of the invention generally share the advantages of the first aspect and can be implemented with a similar degree of technical variation.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
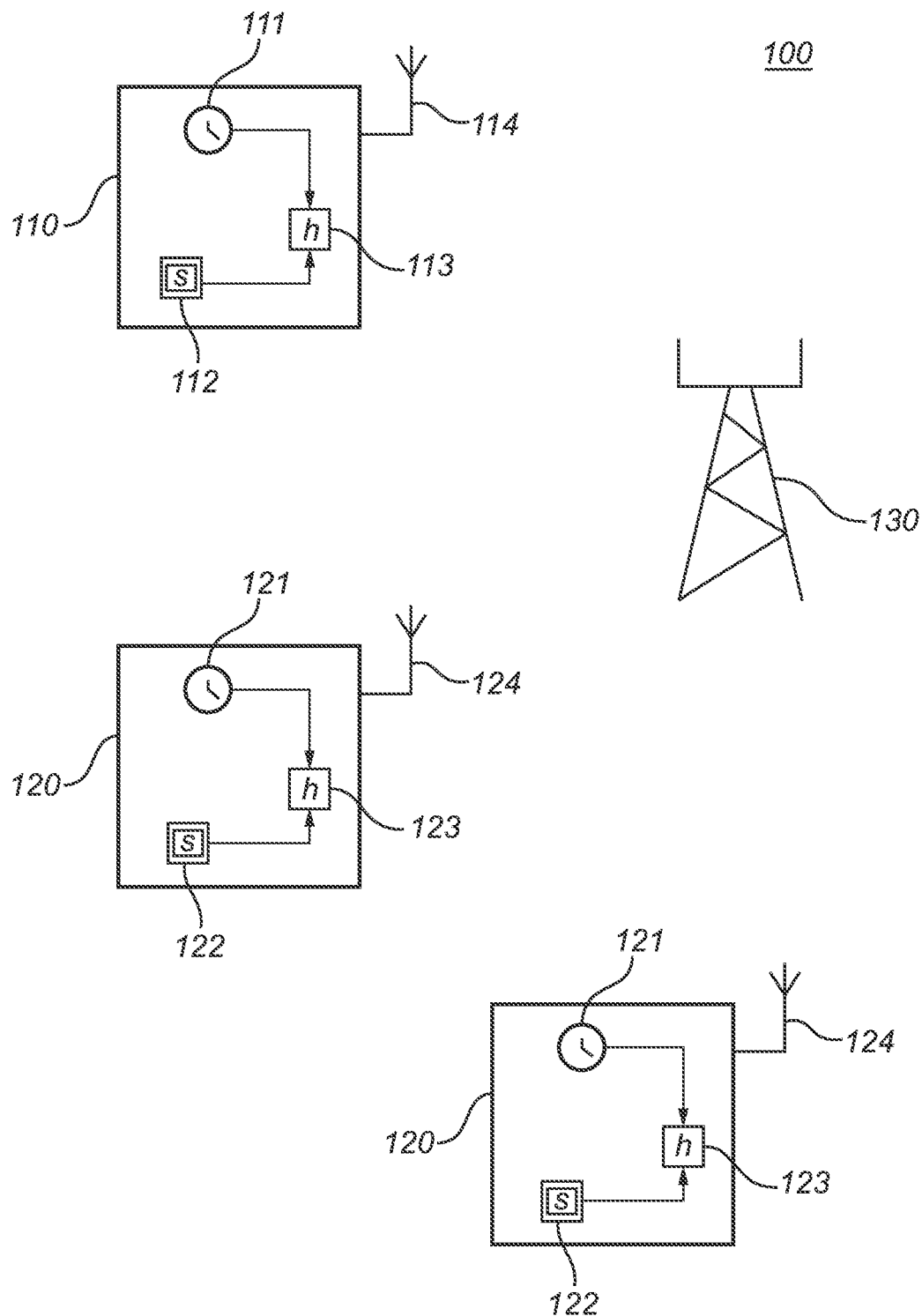
FIG. 1 shows a wireless communication system including a network node and multiple wireless units.

FIG. 1 shows a wireless communication system 100 including a network node 130 and multiple wireless units 110, 120. The network node 130 is not active in all embodiments of the invention and may therefore be regarded as optional.

Each wireless unit 110, 120 includes an internal clock 111, 121, a memory 112, 122, a processor 113, 123 and a wireless interface 114, 124. The value of the internal clock 111, 121 may represent a system time in the wireless unit 110, 120 counted from a specified starting date and with a resolution of the order of 1 millisecond, like for UNIX or POSIX system time. The memory 112, 122 is configured to receive and safely store a secret s. The processor 113, 123 is configured to evaluate a predefined function h using a combination of the current value of the internal clock 111, 121 and the secret s from the memory 112, 122 as inputs. The function h is ideally a one-way function, and a hash function may be used in implementations. For instance, implementations may use a cryptographic hash function that provides a safety level considered adequate in view of the risks associated with an impersonation attack on the private wireless communication. Two example cryptographic hash functions are SHA-1, SHA-2, SHA3, SHA-256 and md5sum. The function h shall be predefined in the sense that copies of it on the transmitting and receiving side produce equal results, so that the genuineness of a message can be positively confirmed by a legitimate observer. For purposes of the present invention, there is no strict need to keep the function h secret.

Figure 2:
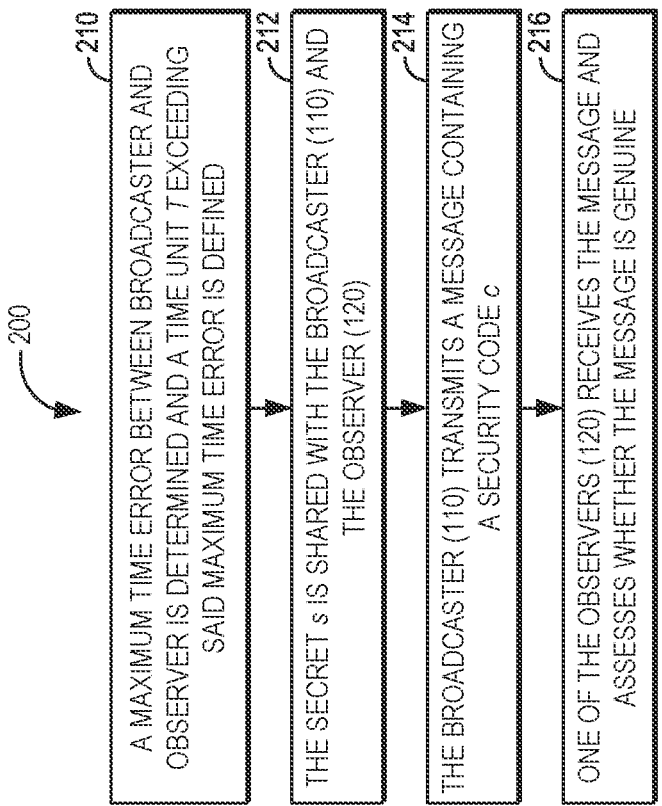

FIG. 2 is a flowchart of a private wireless communication method 200. Although the wireless units are depicted with identical structural features, they are distinguished in FIG. 1 in accordance with their respective roles in the method 200, namely, as one broadcaster (or beacon) 110 and multiple observers 120.

In a first step 210 of the method 200, a maximum time error between broadcaster and observer is determined and a time unit T exceeding said maximum time error is defined. A broadcaster-observer time error is understood to be the difference between the clock 111 of the broadcaster 110 when transmitting the message and the clock 121 of an observer 120 when receiving the message. The observer clock 121 can be synchronized (calibrated) with the addition of an offset corresponding to the expected propagation time, or the synchronization may aim to provide absolute synchronicity. One source of time error is the variation in propagation time from the broadcaster 110 (or, in some embodiments, from the network node 130) to different observers 120 in its coverage area, as are the fluctuations in propagation time that movements of the observers 120 may imply. Another time error source is clock drift after between synchronization events.

In a second step 212 of the method 200, the secret s is shared with the broadcaster 110 and the observer 120, which store it in their memories 112, 122 for later use. The secret s may be a binary or alphanumeric string (password) or a cryptographic key. The use of asymmetric keys (public/private) may help ensure that none of the wireless nodes intended to be observers 120 starts acting as broadcaster 110 without being authorized to do so.

In a third step 214, the broadcaster 110 transmits a message containing a security code c. The broadcaster 110 could transmit the message as a direct broadcast message, so that it may be received by all observers 120 present in the coverage area of the broadcaster 110. Alternatively, the broadcaster 110 could request the network node 130 to transmit the broadcast message on its behalf in the coverage area of the network node 130, which may be a cell of the wireless communication system 100. The broadcaster 110 could even request transmission of the broadcast message in cells not served by the network node 130.

In one embodiment, the message comprises a physical-layer header in which the security code c is included in non-encrypted form. This way, an observer cannot be tricked into decrypting a received message only to discover that it is non-genuine and potentially harmful. The physical layer is understood to be the lowest protocol layer, which normally implies that higher-layer data does not become available until physical-layer processing has been initiated.

In a fourth step 216, one of the observers 120 receives the message. To protect itself from an impersonation attack, the observer 120 assesses whether the message is genuine. The assessment may include comparing the security code c in the message with a value $h(s, t_{120})$ of the predefined function h for a combination of the secret s and a current epoch $t_{120}$, wherein the current epoch is an integer multiple of the time unit T. To evaluate the predefined function h for this input data, the observer 120 retrieves the secret s from the memory 122, reads a system time $t_{120}$ from the internal clock 121 to compute a value $t_{120}$ representing the current epoch. The value may be computed as $t_{120} = \lfloor \tau_{120}/T \rfloor$, which denotes the greatest integer less than or equal to $\tau_{120}/T$ (floor operation). To be precise, the number $t_{120}$ is equal to the number of full time units T elapsed. An equivalent representation of the epoch would be $t_{120}T$. The secret and epoch may be represented as alphanumeric strings in a pre-agreed format and they may be combined by concatenation.

If the observer 120 finds that the security code c in the message is equal to the computed value $h(s, t_{120})$ of the predefined function h it accepts the message as genuine. The message may then be processed further in the observer 120, e.g., by being decrypted, stored, interpreted, and/or executed. If the message passes the test $c = h(s, t_{120})$, the observer 120 can conclude with a high likelihood that the sender of the message is a holder of the secret s and has performed the equivalent operations. This allows the observer 120 to conclude that the sender is indeed the legitimate broadcaster 110. If instead c h(s, $t_{120}$), the observer 120 may reject the message as not genuine. It may then delete, quarantine or in other ways bar the message from being processed further.

In some embodiments, the observer 120 may be configured to accept the message as genuine also if the security code agrees with the value of the predefined function h for a combination of the secret s and any of the epochs $t_{120} \pm 1$ adjacent to the current epoch $t_{120}$. This is to say, the message is deemed to be genuine if $c = h(s, t_{120}-1)$ or $c = h(s, t_{120})$ or $c = h(s, t_{120}+1)$. By introducing a tolerance in this or a similar manner (e.g., ±2, ±3, ... ), the likelihood of false rejections is reduced. However, the tolerance also renders the private communication slightly more vulnerable, as an impersonator gets more time to imitate the security code of a previous message.

In different embodiments, the first 210 and second steps 212 may be performed by different entities.

The first step 210 can be performed by the wireless node acting as broadcaster 110. The first step 210 may alternatively be entrusted to the network node 130. The first step 210 can be divided into two halves, wherein one entity determines the maximum time error and another entity defines the time unit T. For example, the broadcaster 110 may receive an indication of maximum time error from the network node 130 and then go on to define the time unit T and make it available to the observers 120. Alternatively, one network node 130 of the wireless communication system 100 may determine the maximum time error and another network node (not shown) may define the time unit T and communicate it (e.g., as broadcasted system information) to wireless units in the cell which it serves. Further alternatively, the network node 130 may determine the maximum time error and share it with the broadcaster 110 and observers 120, which each determine the time unit T according to a prespecified rule.

The maximum time error may be determined in a variety of ways. The determination may for example include estimating a roundtrip time. This may be done by two cooperating entities, e.g., the network node 130 and the broadcaster 110, or the broadcaster 110 and the observer 120. The determination may alternatively include estimating a delay spread using a per se known measurement method. The delay spread may indicate the influence of multipath propagation in the broadcaster's 110 vicinity, which may cause the propagation time to vary and thereby render it more difficult to predict. Further alternatively, the maximum time error may be determined by obtaining a cell diameter or coverage area diameter, which represents a theoretical upper bound on the propagation time in the absence of multipath effects. Further still, the maximum time error may take into account relevant hardware and operational characteristics of the broadcaster 110 and/or observers 120, such as the accuracy of the internal clocks 111, 121, their robustness to clock drift over time, scheduled synchronization interval etc.

Once the maximum broadcaster-observer time error has been determined, the time unit T can be defined sufficiently large manner to exceed the time error. For example, if the error is ±3 s, the time unit may be set to T=10 s. Depending on the assumed accuracy of the time error determination, the tolerable incidence of false rejections and other factors at hand in a concrete use case, it may be suitable to introduce a precautionary margin. The margin may be an additive offset added to the maximum time error or it may be a multiplicative factor. In one embodiment, the value of the time unit T may exceed the maximum time error by at least a factor 2. In other embodiments, the time unit T may exceed the maximum time error by at least a factor 3, such as at least a factor 5, such as at least a factor 10, such as at least a factor 100. The additive or multiplicative margin may be included in the prespeficied rule referred to above. Using a greater time unit T may also tend to reduce the total computational load, as the epoch will on average have fewer significant digits.

The second step 212, of sharing a secret s with the broadcaster 110 and observer 120, may be performed by the same entity which is responsible for the first step 210 or by a different entity. Generally speaking, the secret s shall be shared out of band. For example, it may be transmitted by the network node 130 over an encrypted communication channel proper to the wireless communication system 100, e.g., using a device-specific encryption key with which each compliant wireless unit is equipped to be able to operate in the system 100. Alternatively, the secret s is deposited in the broadcaster 110 and observer 120 by their manufacturer. Alternatively, the broadcaster 110 uses a safe key exchange scheme, several of which are described in the literature, to share the secret s with the wanted observers. Further alternatively, the broadcaster 110 may transmit the secret s to the observer 120 in controlled circumstances such that the observer 120 can verify that no other entity is transmitting to it. It is recalled that the scenario primarily addressed by the present disclosure is impersonation, not eavesdropping.

Figure 3:
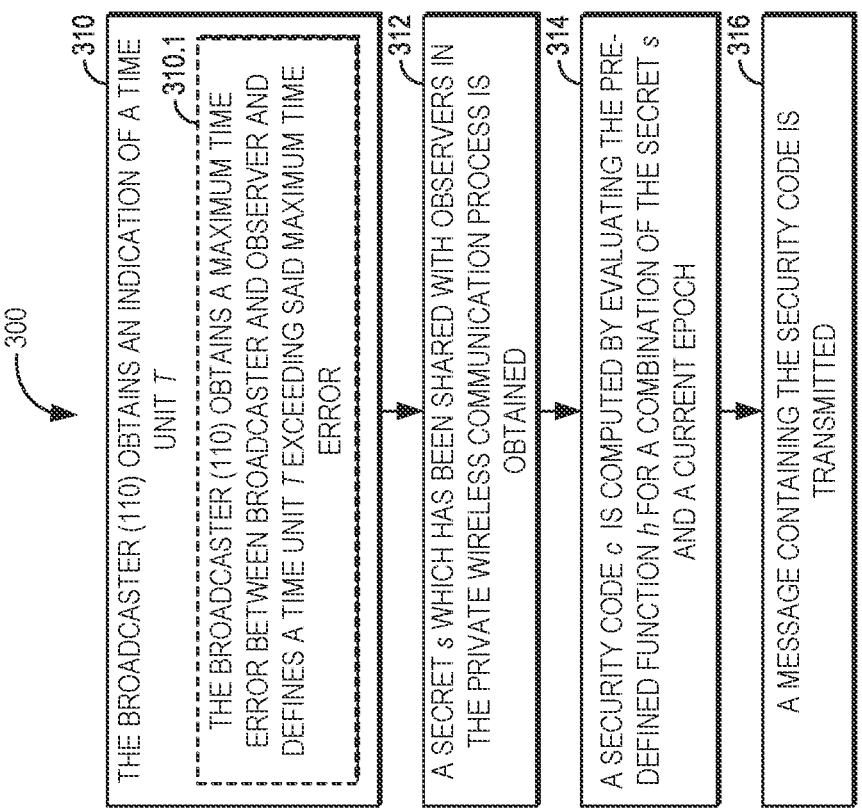
FIGS. 2 to 4 are flowcharts of methods according to different embodiments.

The broadcaster's 110 participation in the above-described process may take the form of the method 300 depicted in FIG. 3.

The method 300 includes a first step 310 of obtaining an indication of a time unit T. The time unit T is expected to exceed a maximum time error between broadcaster and observer, although for purposes of this method 300 the broadcaster 110 may simply trust that this is fulfilled. Indeed, as may be understood from the preceding description of step 210, the broadcaster 110 may receive the indication of the time unit T from a different entity, such as the network node 130. Alternatively, the broadcaster 110 is responsible for defining the time unit T, wherein, as part of a substep 310.1, the broadcaster 110 obtains a maximum time error between broadcaster and observer and defines a time unit T exceeding said maximum time error. The broadcaster 110 may receive the maximum time error from a different entity or may determine it actively. Substep 310.1 may include sharing the time unit T with one or more wireless units that are wanted observers in the private wireless communication process, or requesting the network node 130 to share the time unit T over a suitable channel.

The method 300 in the broadcaster 110 may further include a second step 312 of obtaining a secret s which has been shared with said wanted observers in the private wireless communication process. Here, "obtaining" may include receiving the secret s from another entity in the wireless communication system 100, retrieving the secret s from the memory 112, from software code or using circuitry in which the secret s is hardcoded. Reference is made to the description of step 212.

In a third step 314, a security code c is computed by evaluating the predefined function h for a combination of the secret s and a current epoch, that is, $c=h(s, t_{110})$. It is recalled that the current epoch is an integer multiple of the time unit T and is based on a current time $\tau_{110}$ read from the internal clock 111. The value representing the current epoch may be calculated as $t_{110}=\lfloor \tau_{110}/T \rfloor$.

In a fourth step 316, a message containing the security code is transmitted. Reference is made to the above description of step 214.

Figure 4:
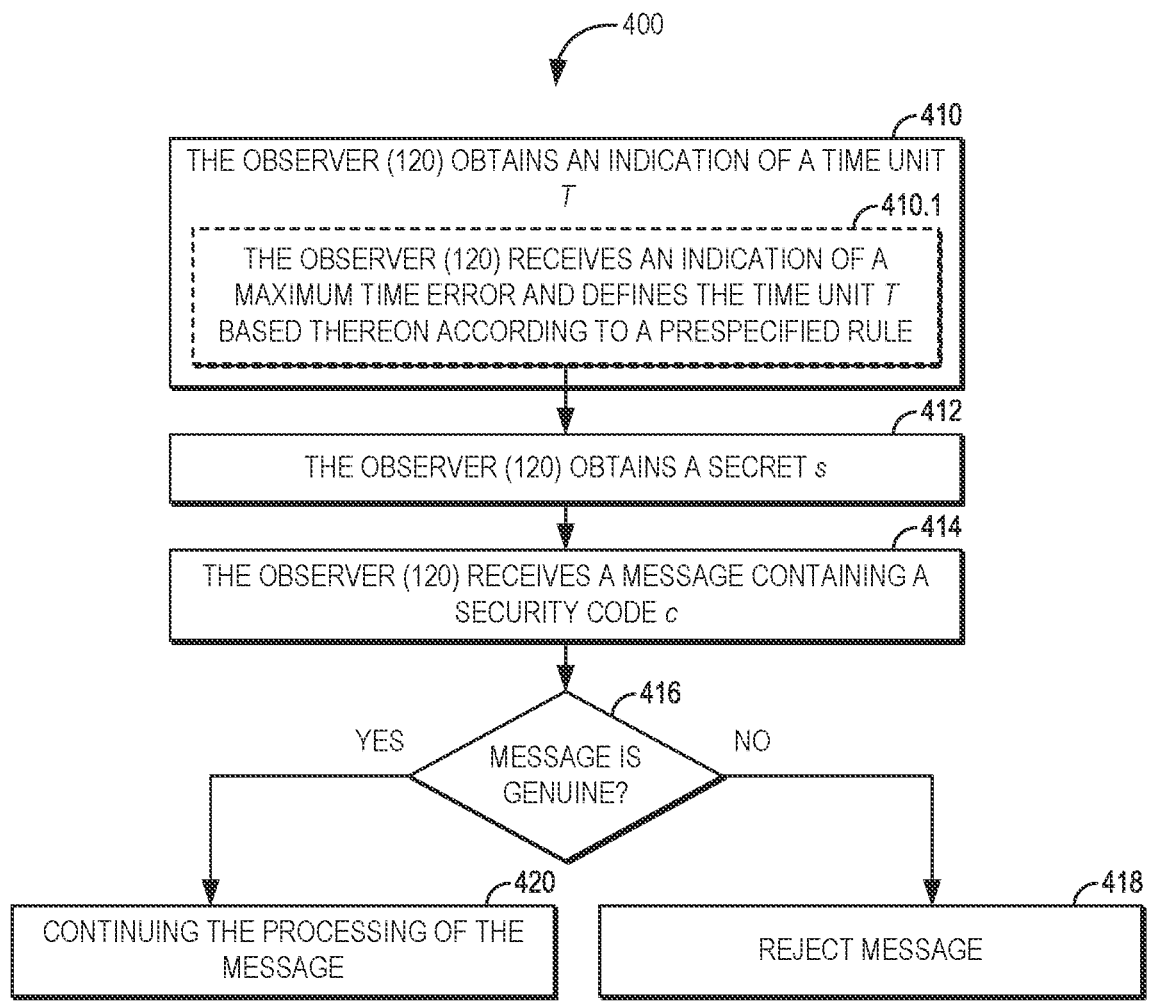

An observer's 120 participation in the above-described process may take the form of the method 400 depicted in FIG. 4.

In a first step 410, the observer 120 obtains an indication of a time unit T. The time unit T is expected to exceed a maximum time error between broadcaster and observer. In one embodiment, the observer 120 receives an indication of the maximum time error and defines, in an optional substep 410.1, the time unit T based thereon according to a prespecified rule.

In a second step 412, the observer 120 obtains a secret s. It is expected that the broadcaster 110, whose messages the observer 120 wishes to receive and discriminate from unauthorized messages, is in possession of an identical secret s. The observer 120 may obtain the secret s by receiving it from another entity or retrieving it from the memory 122. Reference is made to the description of step 212.

In a third step 414, the observer 120 receives a message containing a security code c. For example, the security code c may be unencrypted and contained in a physical-layer header of the message. Preferably, the observer 120 will then use the security code c to verify that the message is genuine before initiating any other processing of the message.

This verification is carried out in a fourth step 416, where it is assessed whether the message is genuine by comparing the security code c with a value $h(s, t_{120})$ of the predefined function h for a combination of the secret s and a current epoch $t_{120}$, wherein the current epoch is an integer multiple of the time unit T. Reference is made to the description of step 216. If the security code and the value of the predefined function are in agreement, $c=h(s, t_{120})$, the outcome of the assessment is positive, in which case (Y branch) the execution of the method 400 proceeds to a step 420 of continuing the processing of the message. In the opposite case (N branch), where the message is deemed not genuine, the message is rejected, as shown in step 418.

If multiple messages per epoch are expected, an efficient implementation of the fourth step 416 may include precomputing $h(s, t_{120})$ and optionally $h(s, t_{120}+1)$ and $h(s, t_{120}-1)$. This may accelerate the processing of a new message. These quantities may be refreshed each time the epoch increments.

Methods and devices enabling private wireless communication have been described above, including an apparently random safety code which changes over time but remains predictable by wanted observers. The wanted observers are able to verify that a received message is genuine before beginning to process the message, which may beneficially reduce the complexity of implementations, allow the use of low-power processors and conserve energy consumed in battery-powered devices. The disclosed methods and devices may be put to use in Internet of Things (IoT) applications.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for private wireless communication, including:
   determining, by a network device of a wireless communication system, a maximum time error between a broadcaster device and an observer device and defining a time unit T exceeding the maximum time error;
   sharing, by the network device, a secret s with the broadcaster device and the observer device;
   receiving, by the wireless communication system, a message transmitted by the broadcast device containing a security code c; and
   sending, by the wireless communication system, the message to the observer device to assess genuineness of the message by comparing the security code c with a value $h(s, t_{120})$ of a predefined function h for a combination of the secret s and a current epoch $t_{120}$, wherein the current epoch is an integer multiple of the time unit T.

2. A method, including:
   obtaining, by a broadcaster device, an indication of a time unit T, which has been defined to exceed a determined maximum time error between the broadcaster device and an observer device;
   obtaining, by the broadcaster device, a secret s which has been shared with the observer;
   computing, by the broadcaster device, a security code $c=h(s, t_{110})$ by evaluating a predefined function h for a combination of the secret s and a current epoch $t_{110}$, wherein the current epoch is an integer multiple of the time unit T; and
   transmitting, by the broadcaster device, a message containing the security code c.

3. The method of claim 2, wherein the obtaining includes:
   determining a maximum time error between the broadcaster device and the observer device; and
   defining a time unit T exceeding the maximum time error.

4. A method, including:
   obtaining, by an observer device, an indication of a time unit T, which has been defined to exceed a determined maximum time error between a broadcaster device and the observer device;
   obtaining, by the observer device, a secret s which has been shared with the broadcaster;
   receiving, by the observer device, a message containing a security code c; and
   assessing, by the observer device, the message's genuineness by comparing the security code c with a value $h(s, t_{120})$ of a predefined function h for a combination of the secret s and a current epoch $t_{120}$, wherein the current epoch is an integer multiple of the time unit T.

5. The method of claim 4, wherein the assessing includes accepting the message as genuine in response to the security code c agreeing with a value $h(s, t_{120}\pm 1)$ of the predefined function h for a combination of the secret s and any of the epochs $t_{120}\pm 1$ adjacent to the current epoch $t_{120}$.

6. The method of claim 1, wherein the time unit T exceeds the maximum time error by at least a factor of 2.

7. The method of claim 1, wherein determining the maximum time error includes at least one of the following:
    estimating a roundtrip time;
    estimating a delay spread; and
    obtaining a cell diameter or coverage area diameter.

8. The method of claim 1, wherein the current epoch $t_{110}$, $t_{120}$ in the broadcaster device or the observer device is obtained from an internal clock.

9. The method of claim 1, wherein the message comprises a physical-layer header with the security code c in non-encrypted form.

10. The method of claim 1, wherein the current epoch $t_{120}$ acts as a cryptographic salt.

* * * * *